United States Patent Office 3,281,443
Patented Oct. 25, 1966

3,281,443
PREPARATION AND USE OF DIALKOXYALUMINUM HYDRIDE REDUCING AGENTS
Mack W. Hunt, Ponca City, Okla., assignor to Continental Oil Company, Ponca City, Okla., a corporation of Oklahoma
No Drawing. Filed Feb. 24, 1961, Ser. No. 91,304
7 Claims. (Cl. 260—448)

This application is a continuation-in-part of my application Serial No. 33,624, filed June 3, 1960, and now abandoned.

This invention relates to new selective reducing agents having the general formula Al(OR)$_2$H and to their manufacture and use.

Various hydrides of alkali and alkaline earth metals in particular are now employed as selective reducing agents, mainly for the purpose of eliminating certain oxygenated compounds which appear as contaminants in organic chemical products. Unfortunately, the metal hydrides are insoluble in organic solvents, so that obtaining effective contact between reducing agents and a reducible substance is often difficult. This characteristic leads to inefficient utilization of the hydrides as reducing agents. At the present time the only commercially available hydrides which are very selective in reducing action appear to be the alkali metal borohydrides, particularly sodium borohydride. Other available hydrides are either too reactive to be selective, or are so unreactive that they possess little utility as reducing agents at ordinary temperatures.

It is an object of the present invention to provide selective reducing agents having the general formula Al(OR)$_2$H which possess solubility in organic solvents.

It is also an object of the present invention to provide a process for the production of these dialkoxyaluminum hydride reducing agents which is simple to operate as well as being inexpensive.

It is another object of my invention to provide a process for the preparation of the foregoing compounds from materials which are readily available.

It is another object of this invention to provide a process whereby the foregoing products may be obtained in excellent yields.

It is another object of my invention to provide a direct process for the production of dialkoxyaluminum hydrides involving a minimum of process steps and using moderate reaction conditions.

It is a further object of my invention to utilize dialkoxyaluminum hydrides to selectively reduce carbonyl compounds to alcohols. Other objects and advantages of the invention will become apparent from the following description.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

Briefly, I have discovered a new class of compounds represented by the formula (RO)$_2$AlH which are selective reducing agents and may be made by reacting a compound of the type Me(OR)$_3$ with an aluminum hydride compound selected from the group represented by the formulas R$_2$AlH, (Alk)AlH$_4$ and AlH$_3$ in which Me is boron or aluminum, R represents alkyl groups, both alike and unlike, and (Alk) is an alkali metal, provided that when Me is boron, the aluminum hydride compound is represented by the formula R$_2$AlH. It is also within the scope of this invention to use said selective reducing agents to reduce carbonyl compounds selected from the class consisting of aldehydes, ketones and acid chlorides to corresponding alkoxides while in the presence of substances selected from the class consisting of esters, nitriles, ethers, amides, organic nitrates, aryl halides and aromatic olefinic and saturated hydrocarbons. The alkoxides so obtained may then be converted to the corresponding alcohols by hydrolysis.

Suitable reactants which may be used to make the compounds of this invention are discussed and specifically exemplified below.

Suitable dialkylaluminum hydrides include compounds having the formula AlR$_2$H in which R is an alkyl radical and the carbon content of the alkyl radicals varies from 1 to 20 or even more. Although theoretically there is no limit to the number of carbon atoms in the alkyl radical that can be used, I generally prefer to employ a dialkylaluminum hydride wherein the carbon content of the alkyl radicals varies from 2 to about 12. Obviously, the alkyl radicals of the dialkylaluminum hydride can be the same or different. Compounds which can be employed include materials such as dimethylaluminum hydride, di-n-propylaluminum hydride, di-n-butylaluminum hydride, diisobutylaluminum hydride, di-n-hexylaluminum hydride, methylpropylaluminum hydride, ethylbutylaluminum hydride, di-n-dodecylaluminum hydride, and the like. A specific compound that I have used very successfully in my process is diethylaluminum hydride. Methods for the preparation of this compound and other dialkylaluminum hydrides are described in the literature and form no part of the present invention. In this regard, reference is made to:

R. S. Brokaw and R. N. Pease, "The Kinetics of the Reaction of Aluminum Borohydride Vapor With Olefins," J. Am. Chem. Soc., 72, 3237 (1950);

K. Ziegler and H. G. Gellert, "Aluminum Organic Synthesis in The Field of Olefinic Hydrocarbons," Angew Chem., 64, 323–329 (1952);

K. Ziegler, "Trialkylaluminum and Alkylaluminum Hydrides," British Patent No. 770,707, March 20, 1957; and K. Ziegler, "Dialkylaluminum Hydrides," British Patent No. 778,098, July 3, 1957.

Suitable alkyl borates are those of the general formula B(OR)$_3$ in which R is an alkyl radical having a number of carbon atoms varying from 1 to about 18 or higher. Preferred esters are those wherein the alkyl groups have from 1 to about 5 carbon atoms. Here again, it is obvious that the R's can be the same or different. Specific borate esters include materials like trimethyl borate, triethyl borate, methyl diethyl borate, tri-n-propyl borate, tri-isopropyl borate, tri-n-hexyl borate, diethyl-n-butyl borate, tri-n-butyl borate, triisooctyl borate, tri-n-decyl borate, tri-n-dodecyl borate, and the like.

Suitable aluminum alkoxides are those of the general formula Al(OR)$_3$ in which R represents alkyl radicals, alike or unlike, having from 1 to 20 carbon atoms or more. In general, the alkoxides having alkyl groups of about 2 to 10 carbon atoms are more easily made and are cheaper. However, it may be desirable to use other alkoxides for the purpose of modifying the solubility properties of the dialkoxyaluminum hydride. Specific aluminum alkoxides which are suitable are aluminum ethoxide, aluminum isopropoxide, aluminum n-butoxide, aluminum isobutoxide, aluminum hexoxide, aluminum octoxide, and aluminum dodecoxide.

The alkali metal aluminum hydrides may be compounds represented by the formula (Alk)AlH$_4$ in which (Alk) is any alkali metal. However, sodium aluminum hydride is preferred.

Aluminum hydride is a very expensive compound, difficult to obtain pure. However, absolute purity is fortunately not required for synthesis of dialkoxyaluminum hydrides.

The relative proportions of the reactant aluminum hydride compound and the alkoxy compound may be varied over a wide range. Theoretically in my process, three moles of the aluminum hydride compound are reacted with two moles of the alkoxy compound. This may be illustrated by the equation given below:

$$3AlR'_2H + 2B(OR)_3 \rightarrow 2BR'_3 + 3Al(OR)_2H$$

Although an excess of either reactant may be used without having any material effect upon the reaction, I prefer to employ the reactants in stoichiometric quantities. An excess of either component complicates the procedure in that the purification of the hydride is made more difficult.

In view of the fact that the particular reactants used may be selected from a large list and since the best operating temperature depends largely upon the specific reactants used, the temperature employed may vary from about 25° C. to 150° C. Generally, I prefer to operate within a temperature range of 50° C. to 90° C. Somewhat more specifically, as a rule I prefer to operate at a temperature which is slightly below the normal boiling point of the component present which has the lowest boiling point. It is to be understood, however, that higher or lower temperatures may be used with a resultant increase or decrease in the reaction rate in accordance with the general law of chemical reactions.

In order to disclose the nature of the present invention still more clearly, the following illustrative examples will be given. It is to be understood that the invention is not to be limited to the specific conditions or details set forth in these examples except insofar as such limitations are specified in the appended claims. Parts given are parts by weight.

MANUFACTURE OF DIALKOXYALUMINUM HYDRIDES

Example 1

A suitable flask was equipped with a cold finger condenser, thermometer, and dropping funnel. Then 44.9 parts of $Al(C_2H_5)_2H$ was charged to the flask, and 80.0 parts of $B(O-isoC_4H_9)_3$ was added thereto dropwise. The temperature was maintained at 80° C. by the heat of reaction. Immediately after the addition of the ester, volatile materials were removed to 200° C. under slight vacuum. The volatile material was analyzed by GLPC and was found to be almost pure triethylborine. A yield of 33.0 parts of distillate was obtained versus a theoretical yield of 34.1 parts.

The material left in the reaction flask was dissolved in xylene. Then an aliquot portion was hydrolized with dilute HCl. The gas that evolved was found to be almost pure hydrogen and corresponded to 75 percent of the theoretical amount obtainable according to the following equation:

$$Al(O-isoC_4H_9)_2H + 3H_2O \rightarrow Al(OH)_3 + H_2 + 2iso\text{-}C_4H_9OH$$

Example 2

The procedure of the foregoing example was repeated in which case the following esters of boron were substituted for the triisobutyl borate used in the above-described example: Triisopropyl borate, tri-n-butyl borate, tri-n-hexyl borate, and trihexadecyl borate.

The physical form of the dialkoxyaluminum hydride obtained in each case was as follows: Isopropyl, viscous clear liquid; isobutyl, milky semisolid; n-butyl, white solid; n-hexyl, white to gray solid, and hexadecyl, white to gray solid.

Upon hydrolysis the products yield 75 to 90 percent of the theoretical hydrogen according to their formula. This gas was analyzed by mass spectroscopy and found to be exclusively hydrogen.

Although the above products are active reducing agents, they are not spontaneously ignitable in air. They are stable to dry air and do not decompose in storage.

The stability of these materials in air is demonstrated in the following experiment: Seventy grams of a 50 percent solution of $Al(O-isoC_4H_9)_2H$ in xylene were charged to a 300 milliliter flask equipped with condenser, an inlet tube with a glass frit opening below the surface of the liquid, and a thermometer. The mixture was heated to 50° C., and dry air was pulled through the frit by a reduced pressure applied at the top of the condenser. At the end of 20 hours, an aliquot portion was hydrolyzed. This showed that the mixture had lost only 14 percent of the available hydrogen that was present in the original solution.

Analysis by emission spectrograph shows that some of the boron remains in the above products. It is probably present as the oxide, acid, ester, or complex because no boron hydride bands have been found by infrared examination. This small amount of boron is less than 1 percent, and need not be removed for utilization of these products as selective reducing agents. Traces of aluminum alkoxides may also appear as impurities in products made according to the procedure described above, but do not affect the useful properties of these products.

The isopropoxy- and isobutoxyaluminum hydrides are soluble to at least 25 percent in common hydrocarbon and ether solvents.

In addition to the method as outlined above for the preparation of a dialkoxyaluminum hydride, I have discovered other methods for the preparation of these compounds. In one of these methods, an alkali metal aluminum hydride is reacted with an aluminum alkoxide compound in accordance with the following equation:

$$(Alk)AlH_4 + 2Al(OR)_3 \rightarrow (AlkH + 3Al(OR)_2H$$

wherein (Alk) is an alkali metal and R is as previously defined. This reaction which can be illustrated experimentally as follows is carried out under conditions similar to those set forth in Example 1.

Example 3

A 300 milliliter flask was equipped with a cold finger condenser, thermometer, dropping funnel and mechanical stirrer. A total of 5.4 parts of sodium aluminum hydride was dissolved in 50 parts of tetrahydrofuran and charged to the flask. A total of 40.8 parts of distilled aluminum isopropoxide dissolved in 50 parts of tetrahydrofuran was added dropwise over 20 minutes with stirring. The mixture was then heated to 50° C. and stirred for 2 hours.

A precipitate which formed on the addition of the $Al(O-isoC_3H_7)_3$ solution was removed by filtration, and the filtrate was placed in a high vacuum distillation apparatus. The tetrahydrofuran was removed by heat, and then the unreacted $Al(O-isoC_3H_7)_3$ was removed at high temperature and low pressure. At 0.5 millimeter and 180° C., a liquid and a large amount of hydrogen were collected. This liquid had the same properties as the $Al(O-isoC_3H_7)_3$ prepared in Example 2. It contained about 75 percent of the theoretical hydrogen according to its molecular formula and gave the same infrared spectrum as the material prepared in Example 2.

In another method, an alkali metal aluminum hydride is reacted with aluminum chloride to form aluminum hydride, which is then reacted with an aluminum alkoxide to form the desired product which can be expressed equation-wise as follows:

$$3(Alk)AlH_4 + AlCl_3 \rightarrow 4AlH_3 + 3(Alk)Cl$$
$$AlH_3 + 2Al(OR)_3 \rightarrow 3Al(OR)_2H$$

wherein (Alk) is an alkali metal and R is as previously defined. These two reactions can be illustrated experimentally as follows:

Example 4

A 300-milliliter, 3-necked flask was equipped with a dropping funnel, cold finger condenser, thermometer, and mechanical stirrer. The flask was charged with 7.5 parts of $NaAlH_4$ and 50 parts of tetrahydrofuran. A total of 6.5 parts of $AlCl_3$ in 50 parts of tetrahydrofuran was added to the above-stirred mixture over a 20-minute period. A white precipitate formed during the addition. After the mixture was stirred for two hours, 46.5 parts of $Al(O\text{-}isoC_3H_7)_3$ in 100 parts of tetrahydrofuran was added dropwise over 20 minutes. This mixture was also stirred for two hours. The solution was filtered, and the solvent removed by heat. The product was distilled at approximately 0.5 millimeter and 130° C. It had the same properties as the original samples prepared according to Example 3. A sample of this product was hydrolyzed with deionized water. No chloride ion was present, which indicates the product contained no aluminum chloride.

In the methods of manufacture disclosed above, combinations of reactants are used which contain or produce both aluminum alkoxide and aluminum hydride structures. Any combination, in suitable proportions, of reactants known to produce these structures might be expected, in view of the above, to yield dialkoxyaluminum hydrides. However, in specific experiments many such combinations have failed to give the desired products under the conditions employed in the preceding examples, among which are the following: $RAl(OR)_2+H_2$; $R_2AlH+ROH$; $R_2AlH+O_2$, and $AlH_3+B(OR)_3$.

It must be concluded that the requirements for the choice of reactants to produce dialkoxyaluminum hydrides are not as simple as they may appear.

DIALKOXYALUMINUM HYDRIDES AS REDUCING AGENTS

The most interesting reactions of dialkoxyaluminum hydrides are the reductions that can be carried out with them. For instance, the dialkoxyaluminum hydrides may be used to reduce ketones to alcohols, as shown by the following example:

Example 5

A 200-milliliter, three-necked flask was equipped with thermometer, dropping funnel, condenser, and mechanical stirrer. A total of 15.6 grams of $Al(O\text{-}isoC_4H_9)_2H$ dissolved in 50 milliliters of xylene was charged to the flask, and 5.8 grams of acetone were added dropwise with stirring. After the addition, the mixture was heated to 50° C. for 2 hours. The reaction mixture was cooled, and the alkoxide contained therein was hydrolyzed with a dilute solution of sulfuric acid. No gas was liberated when the acid solution was added. From this we assumed that the reaction had gone to completion quantitatively. Analysis of both the water and xylene phases by G.L.P.C. (gas-liquid partition chromatography) showed that all the acetone had been converted to isopropanol.

Aldehydrides may also be reduced to alcohols as shown in the equation:

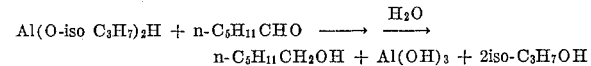

and in the following example:

Example 6

A total of 3.9 grams of $Al(O\text{-}isoC_3H_7)_2H$ and 20 grams of benzene was charged to a 50-milliliter, 3-necked flask equipped with mechanical stirrer. A total of 2.7 grams of n-hexaldehyde was added to this mixture by means of a syringe. After one or two minutes of stirring, a slight excess of dilute sulfuric acid was added to the reaction mixture to hydrolyze the alkoxide. The water layer was removed from the mixture and washed with 5 milliliters of benzene three times. These washings were added to the benzene reaction layer and analyzed by G.L.P.C. This showed that the n-hexaldehyde was completely converted to n-hexanol.

Acid chlorides may also be reduced, as shown in the equation:

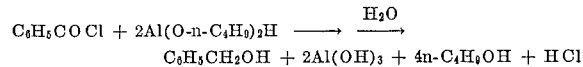

and in the following specific example:

Example 7

A 300-milliliter flask was equipped with a dropping funnel, thermometer, condenser, and mechanical stirrer. The flask was charged with 35.0 grams of $Al(O\text{-}n\text{-}C_4H_9)_2H$ and 100 milliliters of tetrahydrofuran. To this stirred solution, 14.0 grams of benzoyl chloride were added. The temperature was raised to 65° C. and maintained for 1½ hours. The reaction mixture containing alkoxide was then hydrolyzed with 10 percent aqueous NaOH solution and cooled. The mixture was transferred to a separatory funnel and extracted with ether. Analysis of the ether solution by G.L.P.C. showed that only the solvents and benzyl alcohol were present.

Although dialkoxyaluminum hydrides are quite effective as reducing agents, as demonstrated in the preceding examples, their reducing action is quite selective. This is evident in the following table, in which diisopropoxy aluminum hydride is compared with the more common hydrides with respect to reducing ability.

| Compounds Reduced | Hydrides | | | | |
| --- | --- | --- | --- | --- | --- |
|  | NaH | $NaBH_4$ | $LiBH_4$ | $LiAlH_4$ | $Al(O\text{-}iso C_3H_7)_2H$ |
| Aldehydes | No | Yes | Yes | Yes | Yes. |
| Ketones | No | Yes | Yes | Yes | Yes. |
| Esters | No | No | Yes | Yes | No. |
| Nitriles |  | No | No | Yes | No. |
| Acid Chlorides |  | Yes | Yes | Yes | Yes. |
| Organic Nitrates |  | No | Sometimes. | Yes | No. |

The selective reducing ability of dialkoxyaluminum hydrides makes them very useful, for example, for the elimination of aldehyde and ketone contaminants from various chemical products, especially alcohols and ester plasticizers and solvents. After an acid chloride has been used to synthesize an ester, the remaining traces of acid chloride may be converted to the corresponding alcohol, which is usually easily removed by distillation or a solvent wash. The solubility of dialkoxyaluminum hydrides in the common solvents, such as benzene, xylene, n-hexane, ethers and petroleum naphtha greatly facilitates the use of these new selective reducing agents, since they may be employed in the form of homogeneous solutions. Furthermore, the solubility is easily modified by variations in the molecule. Depending upon the alkoxide portion of the molecule, a hydride can be made that is soluble or insoluble in various organic solvents, including hydrocarbons. For example, the isopropyl and isobutyl derivatives are very soluble in benzene, hexane, naphthas and ethers, while the hexyl derivative is soluble in ethers but not in most hydrocarbons. This is in direct contrast with all of the commercially available metal hydrides which are insoluble in hydrocarbon solvents and only sparingly soluble in polar organic solvents.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A process of manufacturing a compound having the general formula $Al(OR)_2H$ which comprises reacting a compound represented by the formula $Me(OR)_3$ with an aluminum hydride compound selected from the group of compounds represented by the formulas $R_2AlH$, $$(Alk)AlH_4$$

and $AlH_3$, in which Me is a metal selected from the group consisting of boron and aluminum, R represents alkyl groups, both alike and unlike and (Alk) is an alkali metal, the aluminum hydride compound being represented by the formula $R_2AlH$ when Me is boron.

2. The process of claim 1 wherein a trialkyl borate is reacted with a dialkylaluminum hydride, said dialkylaluminum hydride having alkyl groups containing from 1 to 20 carbon atoms.

3. The process of claim 2 wherein the alkyl radicals of the trialkyl borate contain from 1 to 18 carbon atoms.

4. The process of claim 1 wherein the reaction is carried out at a temperature within the range of about 25° C. to 150° C.

5. The process of claim 2 wherein stoichiometric quantities of the dialkylaluminum hydride and the trialkyl borate are used.

6. The process for selective reduction of carbonyl compounds selected from the group consisting of aldehydes, ketones and acid chlorides while in the presence of compounds selected from the group consisting of esters, nitriles, amides, organic nitrates, ethers, aryl halides and aromatic, olefinic and saturated hydrocarbons which comprises reduction with compounds having the general formula $Al(OR)_2H$ in which the R's represent alkyl groups which can be alike and unlike.

7. The conversion of carbonyl compounds selected from the group consisting of aldehydes, ketones and acid chlorides to the corresponding alcohols which comprises reduction with compounds having the general formula $Al(OR)_2H$ in which the R's represent the alkyl groups which can be alike and unlike and hydrolyzing the reduction product so obtained.

References Cited by the Examiner

UNITED STATES PATENTS

| | | |
|---|---|---|
| 2,892,858 | 6/1959 | Ziegler. |
| 2,900,402 | 8/1959 | Johnson. |
| 2,903,472 | 9/1959 | Kollonitsch. |

FOREIGN PATENTS

| | | |
|---|---|---|
| 799,823 | 8/1958 | Great Britain. |
| 1,085,515 | 7/1960 | Germany. |

OTHER REFERENCES

Schmitz-Dumont et al.: Die Naturwissenschaften 39, 20 (1952).

Zeitschrift fur Electrochemie, vol. 61 (1957), pp. 1110 to 1117.

TOBIAS E. LEVOW, *Primary Examiner.*

A. LOUIS MONACELL, *Examiner.*

I. PELLMAN, *Assistant Examiner.*